(12) United States Patent
Shankar et al.

(10) Patent No.: US 6,349,319 B1
(45) Date of Patent: Feb. 19, 2002

(54) FLOATING POINT SQUARE ROOT AND RECIPROCAL SQUARE ROOT COMPUTATION UNIT IN A PROCESSOR

(75) Inventors: Ravi Shankar, Sunnyvale; Subramania I. Sudharsanan, Union City, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/240,765

(22) Filed: Jan. 29, 1999

(51) Int. Cl.[7] .............................. G06F 7/552; G06F 7/38
(52) U.S. Cl. ....................................... 708/500; 708/502
(58) Field of Search ................................ 708/500, 502, 708/605

(56) References Cited

U.S. PATENT DOCUMENTS

| | | | |
|---|---|---|---|
| 5,245,564 A | 9/1993 | Quek et al. | 364/754 |
| 5,539,684 A | * 7/1996 | Quintana et al. | 708/500 |
| 5,847,979 A | * 12/1998 | Wong et al. | 708/500 |
| 5,923,577 A | * 7/1999 | Wong et al. | 708/501 |

FOREIGN PATENT DOCUMENTS

| | | | |
|---|---|---|---|
| JP | 03 192429 | 8/1991 | G06F/7/552 |

OTHER PUBLICATIONS

"A Table Based Method to Compute Square Root" IBM Research Disclosure, vol. 41, No. 408, Apr. 1998, XP–002140018, UK.

Lecture Notes in Control and Information Sciences, 38, System Modeling and Optimization, Springer–Verlag, NY, 1982, pp. 276–283, Tsai et al: 'A Robustized Maximum Entropy Approach to System Identification' XP–000920525.

* cited by examiner

*Primary Examiner*—Tan V. Mai
(74) *Attorney, Agent, or Firm*—Skjerven Morrill MacPherson LLP (57) ABSTRACT

A method of computing a square root or a reciprocal square root of a number in a computing device uses a piece-wise quadratic approximation of the number. The square root computation uses the piece-wise quadratic approximation in the form:

$$\text{squareroot}(X) = \bar{A}_i x^2 + \bar{B}_i x + \bar{C}_i,$$

in each interval i. The reciprocal square root computation uses the piece-wise quadratic approximation in the form:

$$1/\text{squareroot}(X) = A_i x^2 + B_i x + C_i,$$

in each interval i. The coefficients $\bar{A}_i$, $\bar{B}_i$, and $\bar{C}_i$, and $A_i$, $B_i$, and $C_i$ are derived for the square root operation and for the reciprocal square root operation to reduce the least mean square error using a least squares approximation of a plurality of equally-spaced points within an interval. In one embodiment, 256 equally-spaced intervals are defined to represent the 23 bits of the mantissa. The coefficients are stored in a storage and accessed during execution of the square root or reciprocal square root computation instruction.

20 Claims, 11 Drawing Sheets

Flow of Data for the Floating Point Reciprocal Square Root

| Cycle | ROM | 16X16 Multiplier | 28X24 Multiplier | 28 bit Adder | 8 bit Adder | Description |
|---|---|---|---|---|---|---|
| 1 | Look Up A, B & C | x*x(B) | | | | Calculate $x^2$. Look Up A, B & C |
| 2 | | $Ax^2$(B) | Bx(CS) | | | |
| 3 | | | | $1/x^{0.5} = Ax^2+Bx+C$ | exp2_un−127 | Approx.$1/x^{0.5}$ Calculate (exp2 − 127)>>1. |
| 4 | | | $Q^1=(1/x^{0.5})*\$B504F3$(CS) | | res_exp= exp1− new_exp2 | Need this additional multiply if the exponent is odd. Calculate (exp1− new_exp2). |
| 5 | | | | Convert $Q^1$ (CS)−> $Q^1$ (B) | res_exp= res_exp−1 | Result available in this cycle. Decrement res_exp unless mant2=1.0 and exp2 is even. |
| 6 | | | | Write result onto the result bus. | | |

FLOATING POINT SQUARE ROOT AND RECIPROCAL SQUARE ROOT COMPUTATION UNIT IN A PROCESSOR

BACKGROUND OF THE INVENTION

1. Field of the Invention

The present invention relates to computational and calculation functional units of computers, controllers and processors. More specifically, the present invention relates to functional units that execute square root and reciprocal square root operations.

2. Description of the Related Art

Computer systems have evolved into versatile systems with a vast range of utility including demanding applications such as multimedia, network communications of a large data bandwidth, signal processing, and the like. Accordingly, general-purpose computers are called upon to rapidly handle large volumes of data. Much of the data handling, particularly for video playback, voice recognition, speech process, three-dimensional graphics, and the like, involves computations that must be executed quickly and with a short latency.

One technique for executing computations rapidly while handling the large data volumes is to include multiple computation paths in a processor. Each of the data paths includes hardware for performing computations so that multiple computations may be performed in parallel. However, including multiple computation units greatly increases the size of the integrated circuits implementing the processor. What are needed in a computation functional unit are computation techniques and computation integrated circuits that operate with high speed while consuming only a small amount of integrated circuit area.

Execution time in processors and computers is naturally enhanced through high speed data computations, therefore the computer industry constantly strives to improve the speed efficiency of mathematical function processing execution units. Computational operations are typically performed through iterative processing techniques, look-up of information in large-capacity tables, or a combination of table accesses and iterative processing. In conventional systems, a mathematical function of one or more variables is executed by using a part of a value relating to a particular variable as an address to retrieve either an initial value of a function or a numeric value used in the computation from a large-capacity table information storage unit. A high-speed computation is executed by operations using the retrieved value. Table look-up techniques advantageously increase the execution speed of computational functional units. However, the increase in speed gained through table accessing is achieved at the expense of a large consumption of integrated circuit area and power.

Two instructions that are highly burdensome and difficult to implement in silicon are a square root instruction and a reciprocal square root operation, typically utilizing many clock cycles and consuming a large integrated circuit area. For example, the square root and the reciprocal square root often have execution times in the range of multiple tens of clock cycles.

For example one technique for computing a square root function or an inverse square root function is to utilize the iterative Newton-Raphson method using a seed value of an approximate value accessed from a lookup table. Hardware for computing the square root or inverse square root includes a multiply/add unit. The iterative technique includes multiple passes through the multiply/add unit. Computation units utilizing the Newton-Raphson method typically take many clock cycles to perform square root and inverse square root operations.

What are needed are a technique for executing square root and reciprocal square root operations, and a computation unit that implements the technique that efficiently execute the operations quickly in a reduced number of clock cycles using a reduced integrated circuit area.

SUMMARY OF THE INVENTION

A method of computing a square root or a reciprocal square root of a number in a computing device uses a piece-wise quadratic approximation of the number. The square root computation uses the piece-wise quadratic approximation in the form:

$$\text{squareroot}(X) = \overline{A}_i x^2 + \overline{B}_i x + \overline{C}_i,$$

in each interval i.

The reciprocal square root computation uses the piece-wise quadratic approximation in the form:

$$1/\text{squareroot}(X) = A_i x^2 + B_i x + C_i,$$

in each interval i.

The coefficients $\overline{A}_i$, $\overline{B}_i$, and $\overline{C}_i$, and $A_i$, $B_i$, and $C_i$ are derived for the square root operation and for the reciprocal square root operation to reduce the least mean square error using a least squares approximation of a plurality of equally-spaced points within an interval. In one embodiment, 256 equally-spaced intervals are defined to represent the 23 bits of the mantissa. The coefficients are stored in a storage and accessed during execution of the square root or reciprocal square root computation instruction.

In a floating point square root or reciprocal square root computation, the value X designates the mantissa of a floating point number and x designates lower order bits of the mantissa. The technique includes accessing the $\overline{A}_i$, $\overline{B}_i$, and $\overline{C}_i$ coefficients or $A_i$, $B_i$, and $C_i$ coefficients from storage and computing the value $\overline{A}_i x^2 + \overline{B}_i x + \overline{C}_i$ or $A_i x^2 + B_i x + C_i$. While computing the square root or reciprocal square root of the floating point number, the exponent of the result is shifted right. To avoid an error that occurs when an odd exponent is shifted right, dropping a "carry" bit, the computed result is multiplied by a correction constant designating a value $2^{0.5}$ or $\frac{1}{2}^{0.5}$.

Several operations are performed in executing an embodiment of the computation method. In multiple data paths performing a plurality of operations in parallel, the coefficients are accessed from storage during calculation of the squared term of the lower order bits x. In a subsequent cycle, two multipliers are employed to calculate the $\overline{A}_i x^2$ or $A_i x^2$ term and the $\overline{B}_i x$ or $B_i x$ term. In a further subsequent cycle the $\overline{A}_i x^2$ or $A_i x$ term, the $\overline{B}_i x$ or $B_i x$ term, and the $\overline{C}_i$ or $C_i$ coefficient are summed to form an approximation result while the exponent of the floating point number is shifted right and corrected for special value cases. In a subsequent cycle, the approximation result is multiplied by a correction constant designating a value $2^{0.5}$ or $\frac{1}{2}^{0.5}$.

In accordance with an embodiment of the present invention, a computation unit includes a multiplier and an adder and accesses a storage storing coefficients for computing a piece-wise quadratic approximation. The computation unit further includes a controller controlling operations of the multiplier and adder, and controlling access of the coefficient storage.

BRIEF DESCRIPTION OF THE DRAWINGS

The features of the described embodiments are specifically set forth in the appended claims. However, embodi

The use of the same reference symbols in different drawings indicates similar or identical items.

DESCRIPTION OF THE EMBODIMENT(S)

Figure 1A:
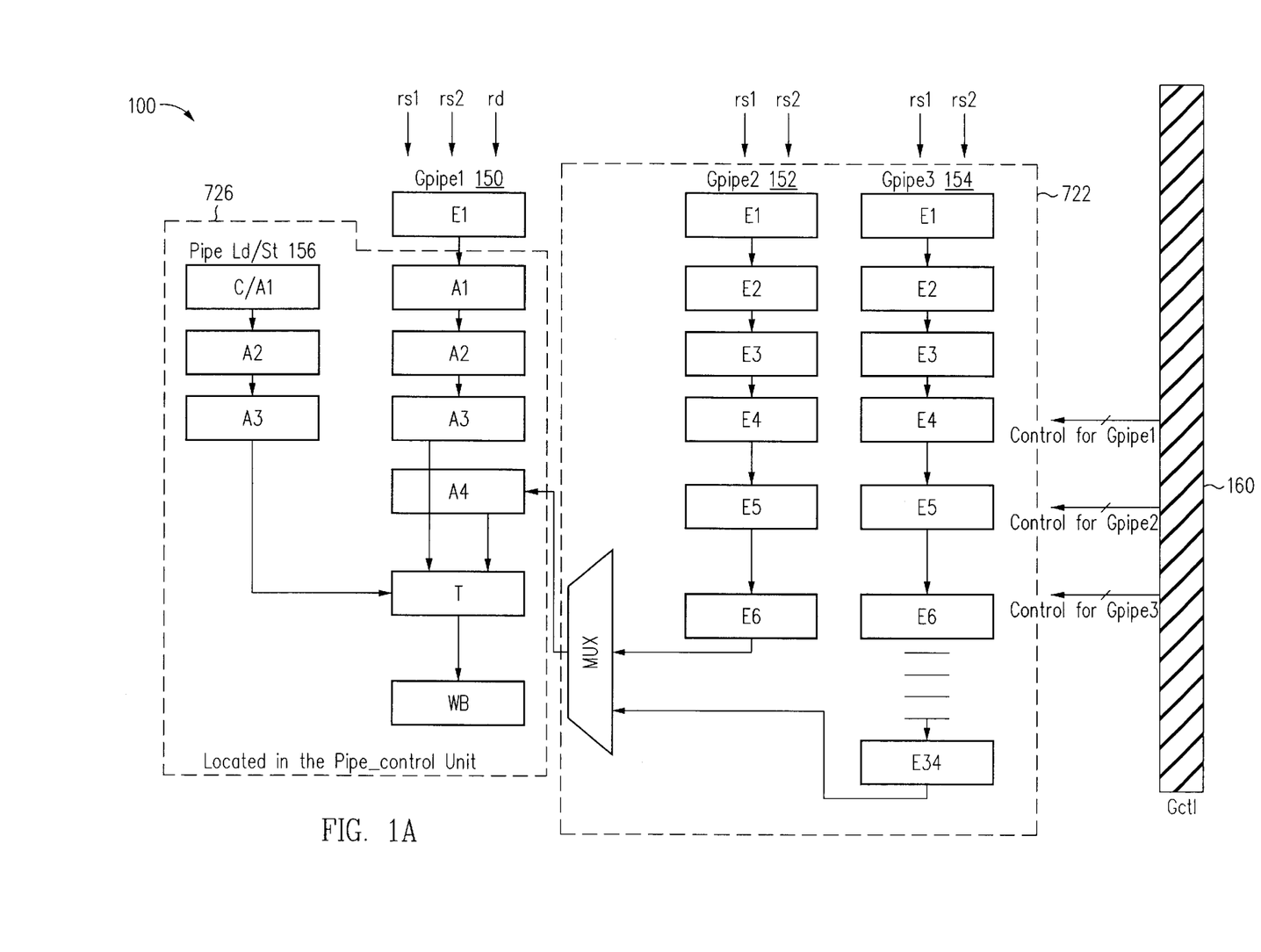
- FIGS. 1A and 1B are respectively a schematic block diagram showing an embodiment of a general functional unit and a simplified schematic timing diagram showing timing of a general functional unit pipeline.
Figure 1B:
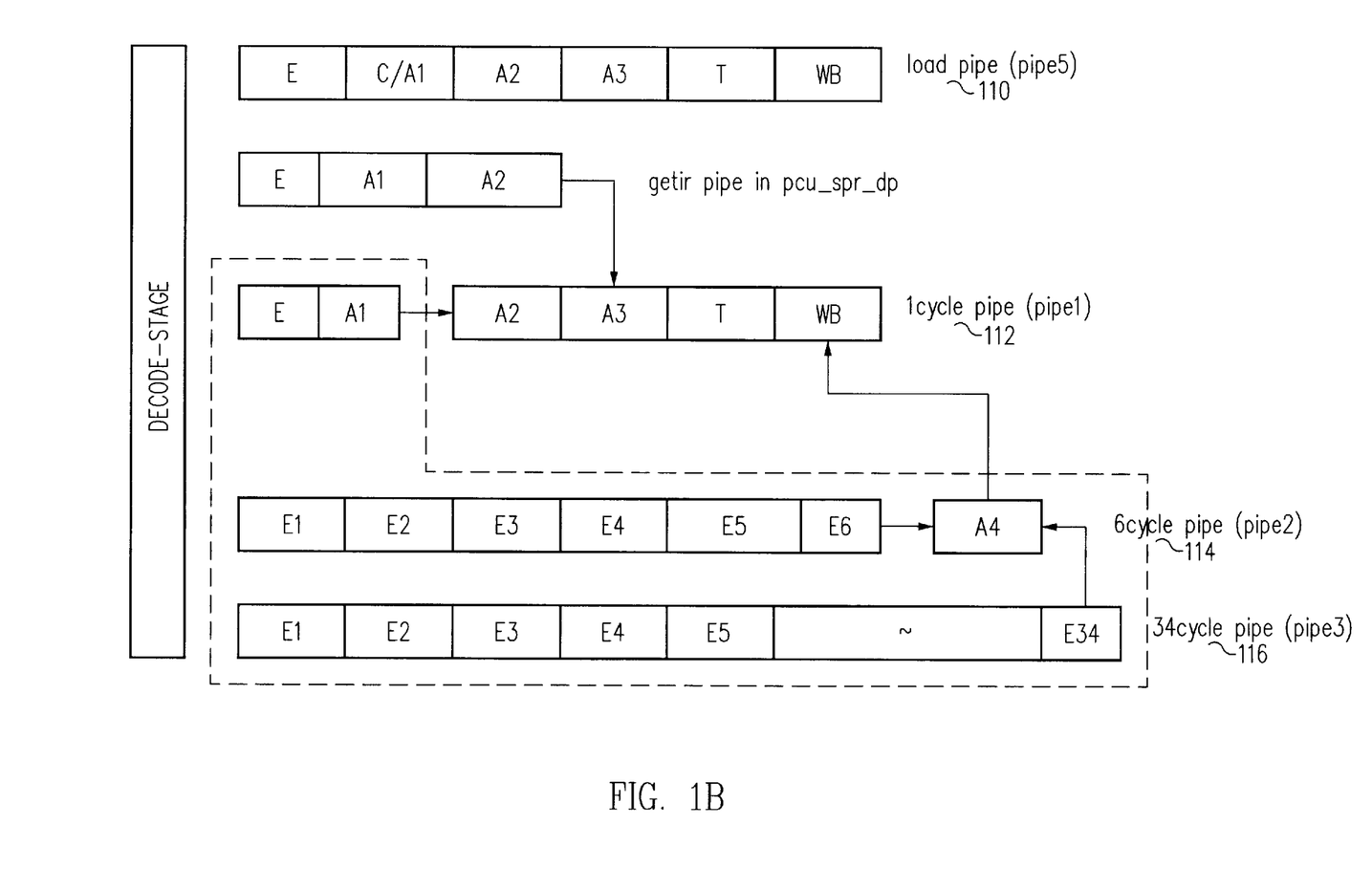

Referring to FIGS. 1A and 1B respectively, a schematic block diagram shows an embodiment of a general functional unit 722 (illustrated as part of a processor in FIG. 7) and a simplified schematic timing diagram illustrating timing of general functional unit pipelines 100. The general functional unit 722 supports instructions that execute in several different pipelines. Instructions include single-cycle ALU operations, four-cycle getir instructions, and five-cycle setir instructions. Long-latency instructions are not fully pipelined. The general functional unit 722 supports six-cycle and 34-cycle long operations and includes a dedicated pipeline for load/store operations.

The general functional unit 722 and a pipeline control unit 726 (also shown more generally in FIG. 7), in combination, include four pipelines, Gpipe1 150, Gpipe2 152, Gpipe3 154, and a load/store pipeline 156. The load/store pipeline 156 and the Gpipe1 150 are included in the pipeline control unit 726. The Gpipe2 152 and Gpipe3 154 are located in the general functional unit 722. The general functional unit 722 includes a controller 160 that supplies control signals for the pipelines Gpipe1 150, Gpipe2 152, and Gpipe3 154. The pipelines include execution stages (En) and annex stages (An).

Referring to FIG. 1B, the general functional unit pipelines 100 include a load pipeline 110, a 1-cycle pipeline 112, a 6-cycle pipeline 114, and a 34-cycle pipeline 116. Pipeline stages include execution stages (E and En), annex stages (An), trap-handling stages (T), and write-back stages (WB). Stages An and En are prioritized with smaller priority numbers n having a higher priority.

A processor implementing the general functional unit 722 supports precise traps. Precise exceptions are detected by E4/A3 stages of media functional unit and general functional unit operations. One-cycle operations are stages in annex and trap stages (A1, A2, A3, T) until all exceptions in one VLIW group are detected. Traps are generated in the trap-generating stages (T). When the general functional unit 722 detects a trap in a VLIW group, all instructions in the VLIW group are canceled.

When a long-latency operation is in the final execute stage (E6 stage for the 6-cycle pipeline 114 or E34 stage for the 34-cycle pipeline 116), and a valid instruction is under execution in the A3-stage of the annex, then the long-latency instruction is held in a register, called an A4-stage register, inside the annex and is broadcast to the register file segments 724 (shown in FIG. 7) only when the VLIW group under execution does not include a one-cycle GFU instruction that is to be broadcast.

Results of long-latency instructions are bypassed to more recently issued GFU and MFU instructions as soon as the results are available. For example, results of a long-latency instruction are bypassed from the E6-stage of a 6-cycle instruction to any GFU and MFU instruction in the decoding (D) stage. If a long-latency instruction is stalled by another instruction in the VLIW group, results of the stalled long-latency instruction are bypassed from the annex (A4) stage to all instructions in the general functional unit 722 and all media functional units 720 (shown in FIG. 7) in the decoding (D) stage.

Data from the T-stage of the pipelines are broadcast to all the register file segments 724, which latch the data in the writeback (WB) stage before writing the data to the storage cells.

Figure 2:
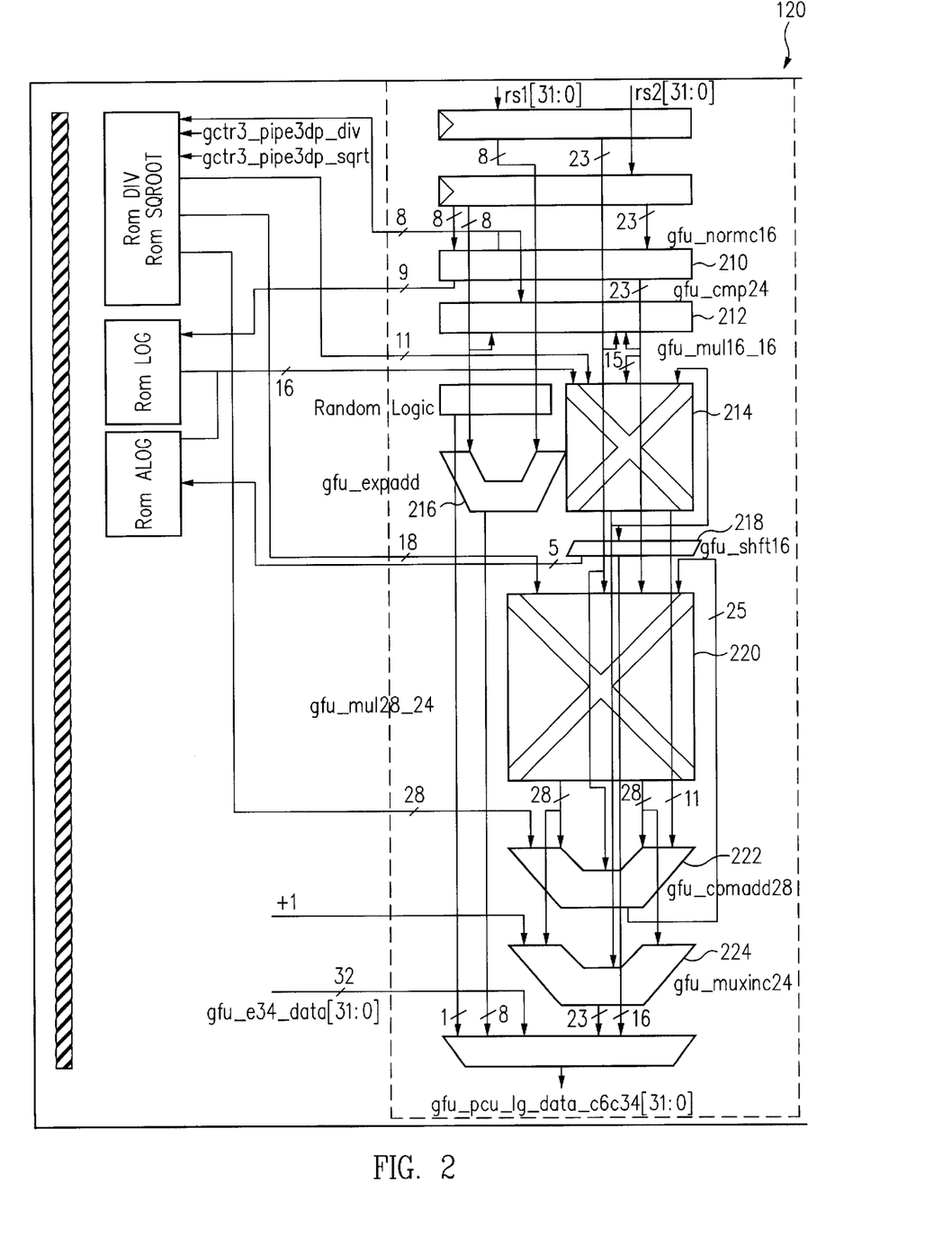
FIG. 2 is a schematic block diagram that illustrates an embodiment of a long-latency pipeline used in the general functional unit.

Referring to FIG. 2, a schematic block diagram illustrates an embodiment of a long-latency pipeline 120 used in the general functional unit (GFU) 722. The long-latency pipeline 120 executes six-cycle instructions. In the illustrative embodiment, the six-cycle instructions include a single-precision floating point division (fdiv) instruction, a single-precision floating point reciprocal square root (frecsqrt) instruction, a fixed-point power computation (ppower) instruction, and a fixed-point reciprocal square root (precsqrt) instruction.

The single-precision floating point division (fdiv) instruction has the form:

fdiv rs1, rs2, rd where rs1 and rs2 designate a numerator source operand and a denominator source operand, respectively. The rd operand designates a destination register for holding the result.

The single-precision floating point reciprocal square root (frecsqrt) instruction has the form:

frecsqrt rs1, rd where rs1 designates a source operand and the rd operand identifies the destination register that holds the reciprocal square root result.

The fixed-point power computation (ppower) instruction has the form:

ppower rs1, rs2, rd where rs1 and rs2 designate source operands and rd identifies a destination register operand. The ppower instruction computes rs1**rs2 for each half of the source registers.

The fixed-point reciprocal square root (precsqrt) instruction has the form:

precsqrt rs1, rd where rs1 designates a source operand and the rd operand identifies the destination register that holds the reciprocal square root result. The precsqrt instruction computes the reciprocal square root for each half of rs1.

The illustrative long-latency pipeline 120 has eight megacell circuits including a 16-bit normalization megacell 210, a 24-bit compare megacell 212, a 16-bit by 16-bit multiplier megacell 214, an exponent add megacell 216, a 16-bit barrel shifter megacell 218, a 25-by-24 multiplier megacell 220, and a compressor and adder megacell 222, and a multiplexer and incrementer megacell 224.

The 16-bit normalization megacell 210 contains a leading zero detector and a shifter that shifts a sixteen bit value according to the status of the leading zero detection. The 16-bit normalization megacell 210 also includes two 4-bit registers that store the shift count values.

The 24-bit compare megacell 212 compares two 24-bit mantissa values. The 24-bit compare megacell 212 generates only equal and less-than signals.

The 16-bit by 16-bit multiplier megacell 214 multiplies two 16-bit values. The actual datapath of the 16-bit by 16-bit multiplier megacell 214 is 18 bit cells wide and includes eight 18-bit rows. The 16-bit by 16-bit multiplier megacell 214 is a radix 4 booth recoded multiplier that generates an output signal in the form of a 32-bit product in binary form. The booth recorders in the 16-bit by 16-bit multiplier megacell 214 are recoded off the binary format in contrast to a carry-save format.

The exponent add megacell 216 subtracts the exponent for a floating point divide operation. The exponent add megacell 216 also performs shifting for execution of a square root operation.

The 16-bit barrel shifter megacell 218 is a 16-bit barrel shifter. The 16-bit barrel shifter megacell 218 is a subset of a 32-bit shifter.

The 25-by-24 multiplier megacell 220 is a 25-bit by 24-bit multiplier. The 25-by-24 multiplier megacell 220 has an actual datapath of 27 bit cells with twelve rows of the 27 bit cells. The 25-by-24 multiplier megacell 220 is a radix 4 booth recoded multiplier that generates an output signal in the form of a 28-bit product in a carry-save format. The booth recoders are recoded from the carry-save format in contrast to a binary format.

The compressor and adder megacell 222 includes a 4:2 compressor followed by a 28-bit adder. The 28-bit adder uses a kogge-stone algorithm with lings modification.

The multiplexer and incrementer megacell 224 produces two 24-bit products, a sum of two 28-bit numbers in the carry-save format and the increment of the sum. The final multiplexer selects a correct answer based on the sign of the result from the compressor and adder megacell 222. The adder of the multiplexer and incrementer megacell 224 uses conditional sum adders.

Figure 3:
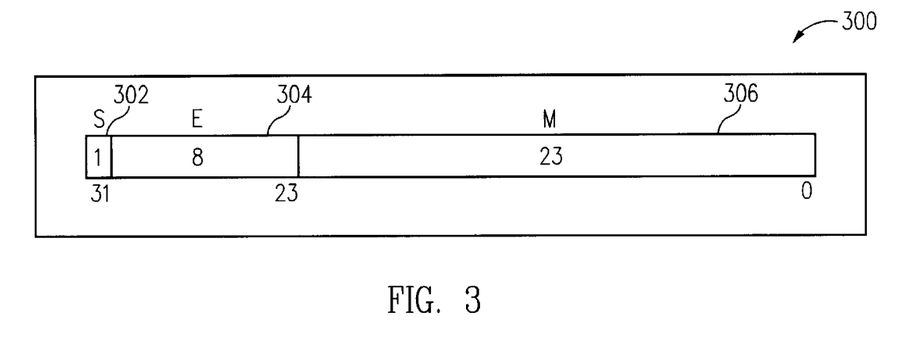
FIG. 3 is a graphic shows the format of a single-precision floating point number.

Referring to FIG. 3, a graphic shows the format of a single-precision floating point number 300. The single-precision floating point format 300 has three fields including one bit for the sign 302, eight bits for the exponent 304, and 23 bits for the mantissa 306. The sign bit 302 equal to zero designates a positive number. The sign bit 302 equal to one designates a negative number. The value of the exponent 304 ranges from 0 to 255. The bias of the exponent 304 is +127. Of the 256 values in the range 0 to 255, only the values of 0 and 255 are reserved for special values. The maximum positive exponent is +127. The minimum negative exponent is −126. The lower order 23 bits designate the mantissa 306, which is an unsigned fractional number. An implicit value of 1 is included prior to the unsigned fraction. The range of values of the mantissa 306 is from 1.0 to $(2-2^{-23})$. The mantissa range is defined only for normal numbers.

The value of a floating point number is given by the equation, as follows:

$$F=(-1)^S 1.M(2^{E-127})$$

For the sign bit 302 (S), the mantissa 306 (M), and the exponent 304 (E).

Several special cases are represented differently than the equation in which the floating point number format is otherwise represented as follows:

(1) If the exponent 304 is 255 and the mantissa 306 is zero then the floating point number represents +/− infinity where the sign of infinity is defined by the sign bit 302.

(2) If the exponent 304 is equal to 255 and M is not equal to zero, then the floating point number is defined as not-a-number (NaN).

(3) If the exponent 304 is equal to zero and the mantissa 306 is equal to zero then the floating point number represents +/−0. The sign of zero is defined by the sign bit 302.

(4) If the exponent 304 is equal to zero and the mantissa 306 is not equal to zero, then the floating point number represents a denormal number. The value of the denormal number is given by the equation, as follows:

$$F=(-1)^S 0.M(2^{E-126})$$

Figure 4A:
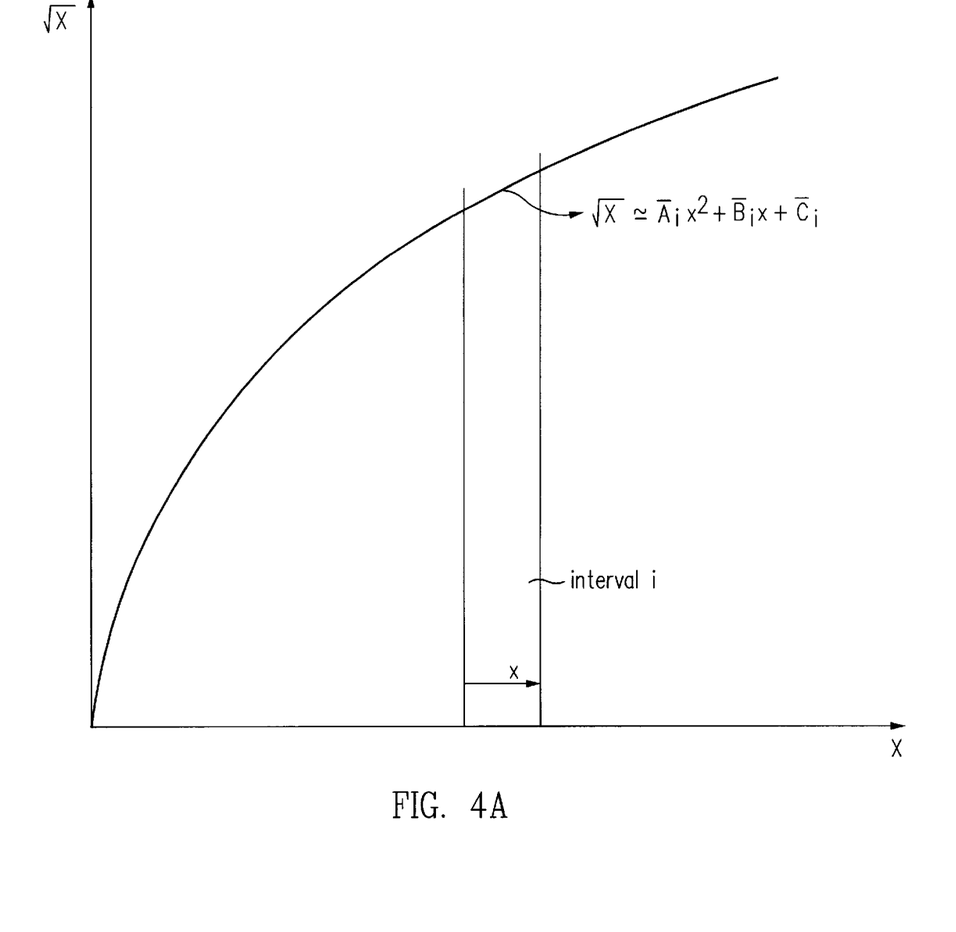
FIGS. 4A, 4B, and 4C are a plurality of graphs showing exponential functions that describe a technique for performing a single-precision floating-point division operation.
Figure 4B:
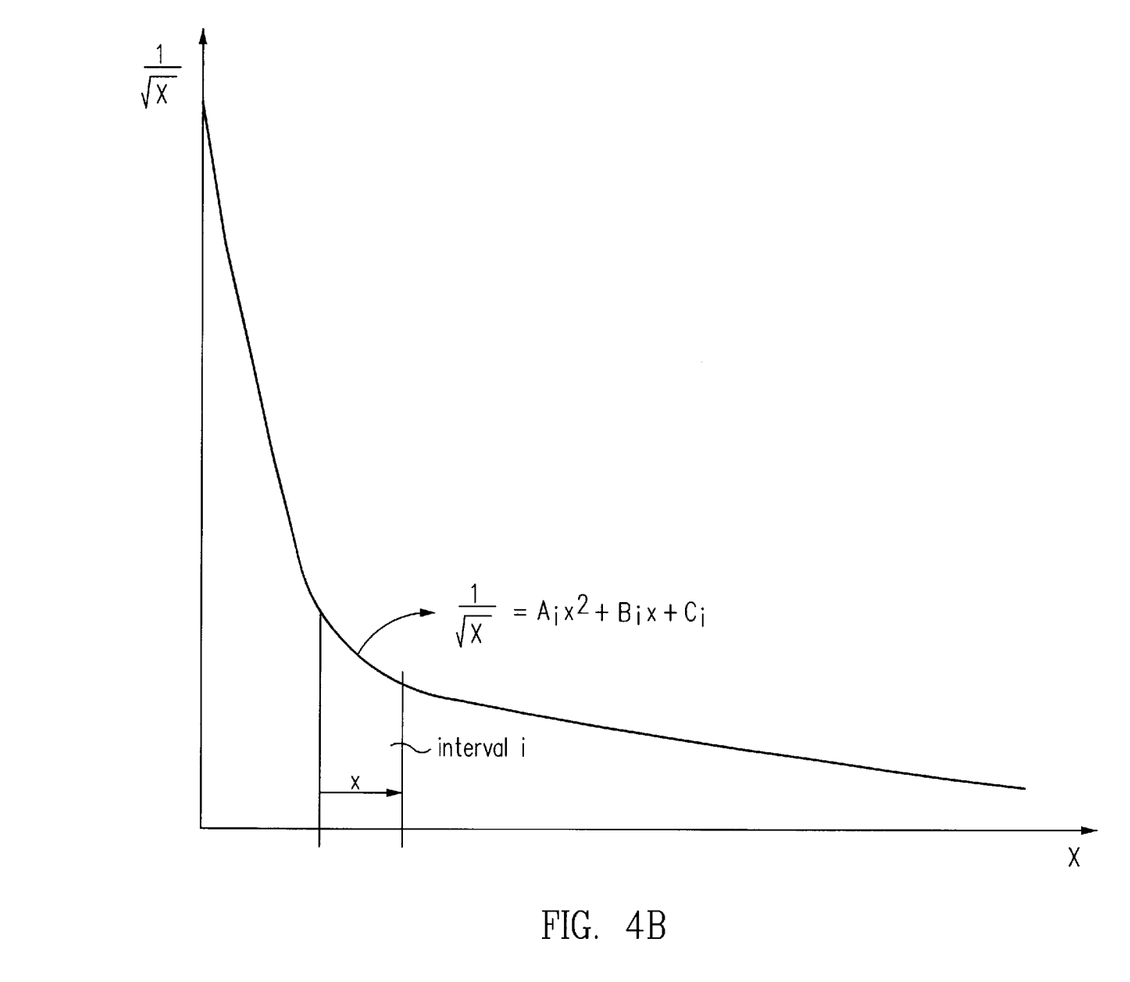
Figure 4C:
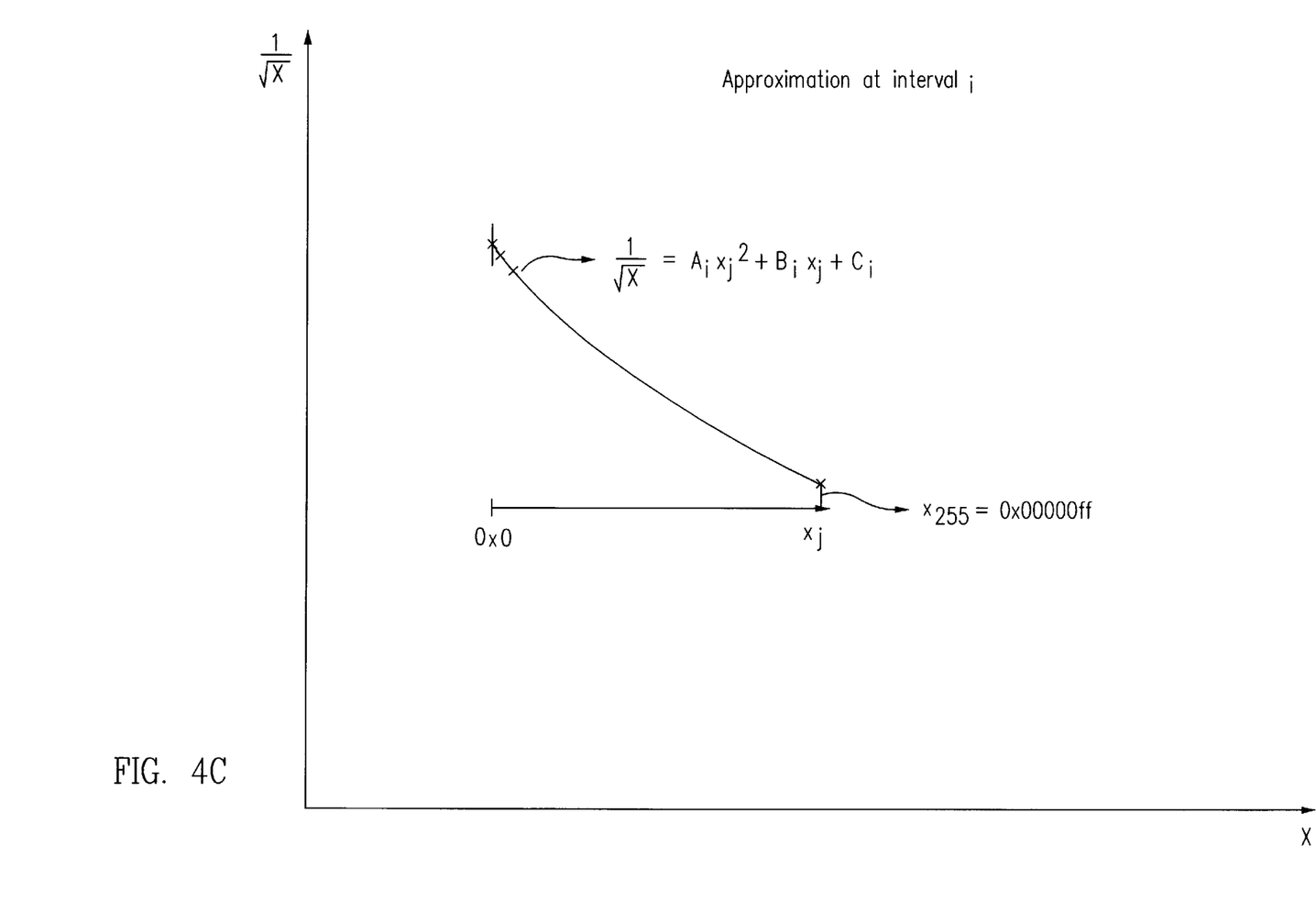

Referring to FIGS. 4A, 4B, and 4C, a plurality of graphs show exponential functions that describe a technique for performing a single-precision floating-point division operation. FIG. 4A is a graph showing an exponential function for computing a square root function $\sqrt{X}$ in an interval i. To determine the coefficients $A_i$, $B_i$, and $C_i$ for the reciprocal square root function $\sqrt{X}$, for each interval i, where i is an integer from 0 to 255, 256 equally-spaced points are selected. At each of the 256 points, the value $\sqrt{X}$ is computed in which X is the mantissa. An equation, as follows:

$$\sqrt{X}=\overline{A}_i x_j^2 + \overline{B}_i x_j + \overline{C}_i,$$

is solved for $x_j$, for a range of integers j from 0 to 255. The values of $x_j$ are the lower-order bits of the mantissa X from $x_0$=0x0 to $x_{255}$=0x00000ff, as is shown in FIG. 4C. Solving for $x_j$ produces 256 equations to solve for the coefficients $\overline{A}_i$, $\overline{B}_i$, and $\overline{C}_i$. The coefficient values are obtained by a singular-value deomposition method (see G. H. Golub and C. F. Van Loan, Matrix Computations, Johns Hopkins University Press, Baltimore, Md. 1983). In one embodiment, a LAPACK software package from the Netlib (www.netlib.org)- Editors Jack Donovan and Eric Grosse is used to compute the coefficients. $\overline{A}_i$, $\overline{B}_i$, and $\overline{C}_i$ are computed for all 256 intervals.

FIG. 4B is a graph showing an exponential function for computing a reciprocal square root function $1/\sqrt{X}$ in an interval i. To determine the coefficients $A_i$, $B_i$, and $C_i$ for the reciprocal square root function $1/\sqrt{X}$, for each interval i, where i is an integer from 0 to 255, 256 equally-spaced points are selected. At each of the 256 points, the value $1/\sqrt{X}$ is computed in which X is the mantissa. An equation, as follows:

$$1/\sqrt{X}=A_i x_j^2 + B_i x_j + C_i,$$

is solved for $x_j$, for a range of integers j from 0 to 255. The values of $x_j$ are the lower-order bits of the mantissa X from $x_0$=0x0 to $x_{255}$=0x00000ff, as is shown in FIG. 4C. Solving for $x_j$ produces 256 equations to solve for the coefficients $A_i$, $B_i$, and $C_i$ using a singular-value deomposition method. $A_i$, $B_i$, and $C_i$ are computed for all 256 intervals. The described procedure may also be used to compute a function 1/X.

Figure 5:
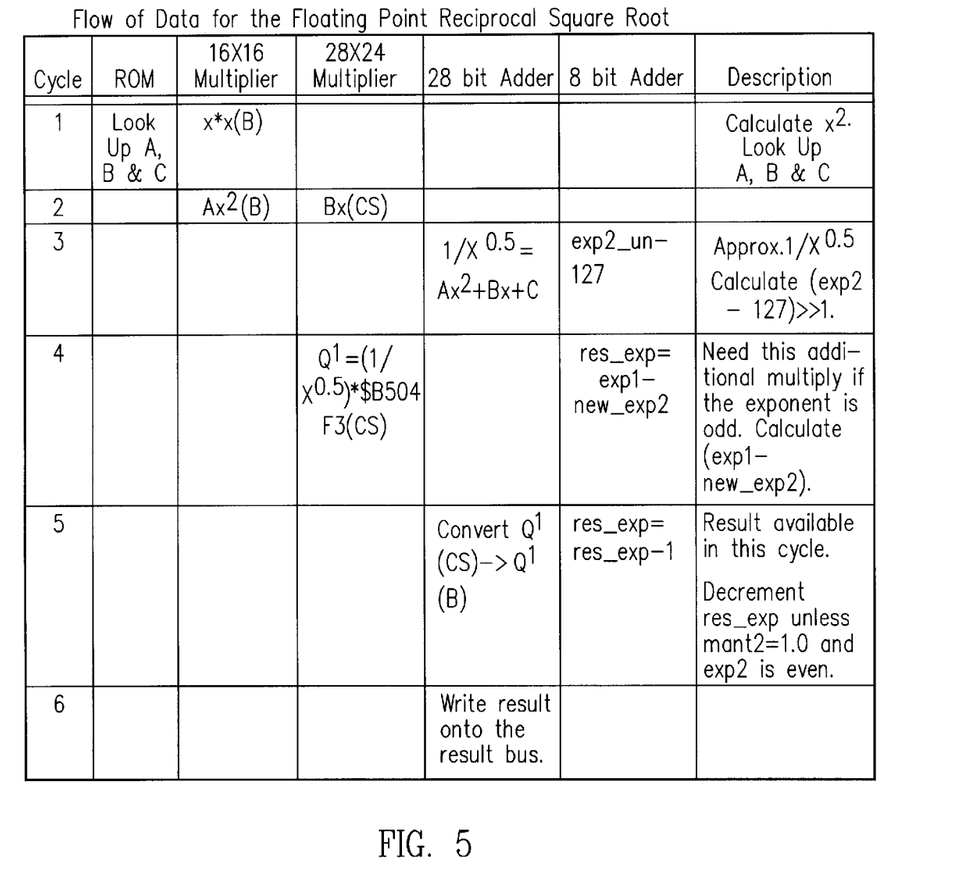
FIG. 5 is a schematic table that shows a data flow for execution of a floating point reciprocal square root instruction.

Referring to FIG. 5, a schematic table shows a data flow for execution of the single-precision floating point reciprocal square root (frecsqrt) instruction. In an illustrative embodiment, the technique for computing the single-precision reciprocal square root of a floating point is the same as the division operation described previously. A piecewise quadratic approximation to $1/\sqrt{X}$ is used. The selected quadratic approximation is described by the equation, as follows:

$$1/\sqrt{X}=Ax^2+Bx+C.$$

In the illustrative embodiment, a ROM storing 256 words is used for the computation. The 256 word capacity is the same as the ROM storage allocated to the floating point division (fpdiv) operation, but having different coefficients A, B, and C.

In a first cycle of the floating point reciprocal square root operation, the source operand x is squared with the result in a binary form using the 16-bit by 16-bit multiplier megacell 214 and values of coefficients A, B, and C are accessed from the ROM using lookup table techniques. In a second cycle, the 16-bit by 16-bit multiplier megacell 214 computes the value $Ax^2$ in the binary form and the 25-by-24 multiplier megacell 220 computes the value Bx in the carry-save form. In a third cycle, the additions of the $Ax^2$, Bx and C terms are performed by a 28-bit adder and an 8-bit adder to compute the approximation $1/X^{0.5}$ and (exp2–127)>>1, respectively.

In a fourth cycle, an additional multiply operation is performed if the exponent is odd. During computation of the square root of a floating point number, the exponent of the result is a simple right shift of the unbiased exponent. However, the simple right shift results in an incorrect result if the unbiased exponent is an odd number. The incorrect result is remedied by multiplying the originally computed result by a constant $B504F3, the value of $½^{0.5}$. The 25-by-24 multiplier megacell 220 performs the additional multiply operation with the result in the carry-save format. The 8-bit adder computes the value (exp1-new_exp2).

In a fifth cycle, the result of the floating point reciprocal square root operation is made available. The 28-bit adder converts the quotient $Q^1$ from carry-save format to binary format. The 8-bit adder decrements the result exponent unless the mantissa 306 is equal to 1.0 and the exponent 304 is even. In a sixth cycle, the result of the floating point reciprocal square root operation is written onto a result bus. The sign of the result is always positive.

Figure 6:
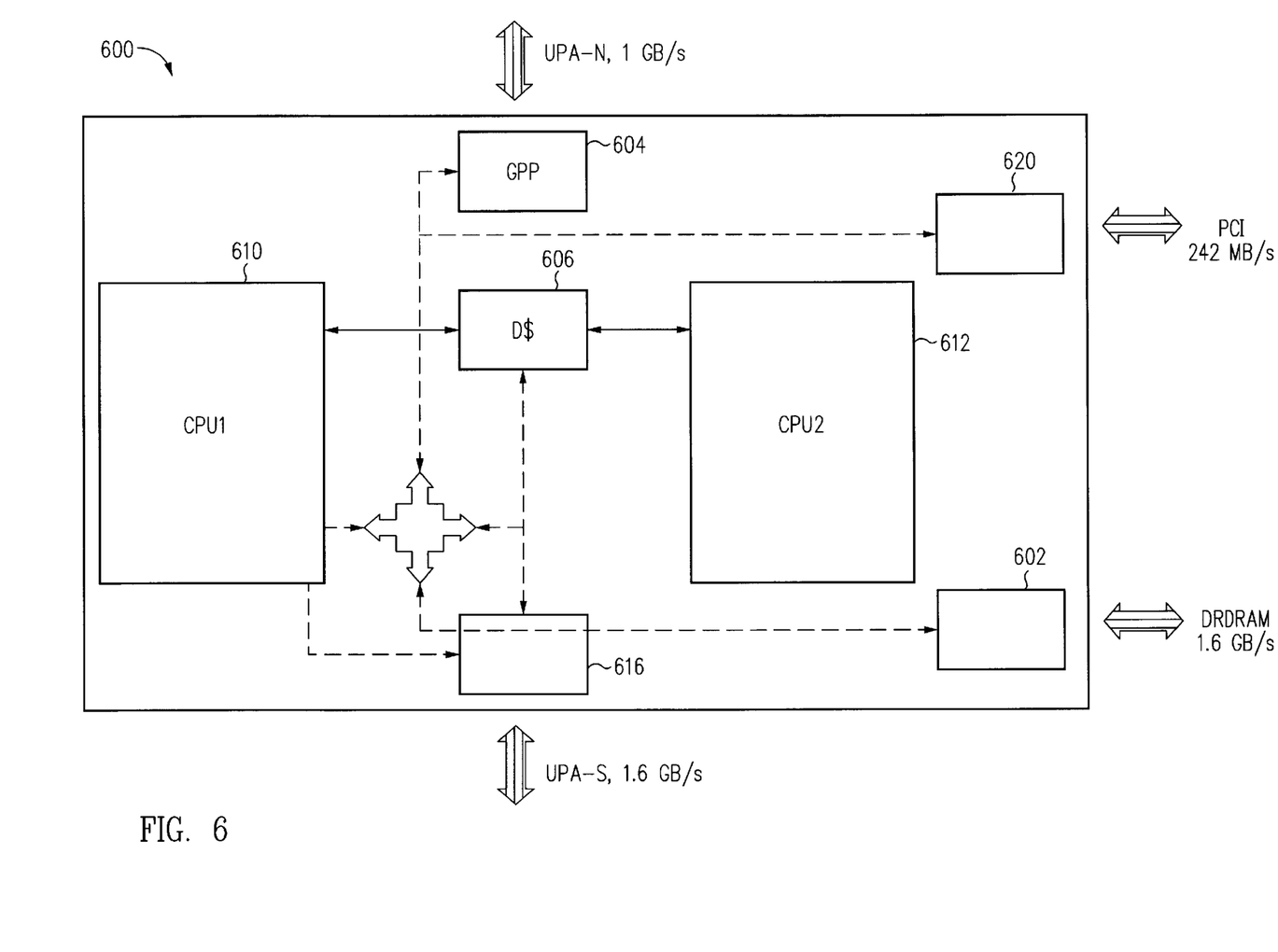
FIG. 6 is a schematic block diagram illustrating a single integrated circuit chip implementation of a processor that is suitable to support the illustrative single-precision floating-point division operation.

Referring to FIG. 6, a schematic block diagram illustrates a single integrated circuit chip implementation of a processor 600 that includes a memory interface 602, a geometry decompressor 604, two media processing units 610 and 612, a shared data cache 606, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels to manage multiple high-bandwidth data streams efficiently and with a low response time. The interface controllers include a an UltraPort Architecture Interconnect (UPA) controller 616 and a peripheral component interconnect (PCI) controller 620. The illustrative memory interface 602 is a direct Rambus dynamic RAM (DRDRAM) controller. The shared data cache 606 is a dual-ported storage that is shared among the media processing units 610 and 612 with one port allocated to each media processing unit. The data cache 606 is four-way set associative, follows a write-back protocol, and supports hits in the fill buffer (not shown). The data cache 606 allows fast data sharing and eliminates the need for a complex, error-prone cache coherency protocol between the media processing units 610 and 612.

The UPA controller 616 is a custom interface that attains a suitable balance between high-performance computational and graphic subsystems. The UPA is a cache-coherent, processor-memory interconnect. The UPA attains several advantageous characteristics including a scalable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scalability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 620 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 610 and 612 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 600 is an eight-wide machine with eight execution units for executing instructions. A typical "general-purpose" processing code has an instruction level parallelism of about two so that, on average, most (about six) of the eight execution units would be idle at any time. The illustrative processor 600 employs thread level parallelism and operates on two independent threads, possibly attaining twice the performance of a processor having the same resources and clock rate but utilizing traditional non-thread parallelism.

Thread level parallelism is particularly useful for Java™ applications which are bound to have multiple threads of execution. Java™ methods including "suspend", "resume", "sleep", and the like include effective support for threaded program code. In addition, Java™ class libraries are thread-safe to promote parallelism. Furthermore, the thread model of the processor 600 supports a dynamic compiler which runs as a separate thread using one media processing unit 610 while the second media processing unit 612 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 610, copying objects or gathering pointer information, while the application is executing on the other media processing unit 612.

Although the processor 600 shown in FIG. 6 includes two processing units on an integrated circuit chip, the architecture is highly scalable so that one to several closely-coupled processors may be formed in a message-based coherent architecture and resident on the same die to process multiple threads of execution. Thus, in the processor 600, a limitation on the number of processors formed on a single die thus arises from capacity constraints of integrated circuit technology rather than from architectural constraints relating to the interactions and interconnections between processors.

Figure 7:
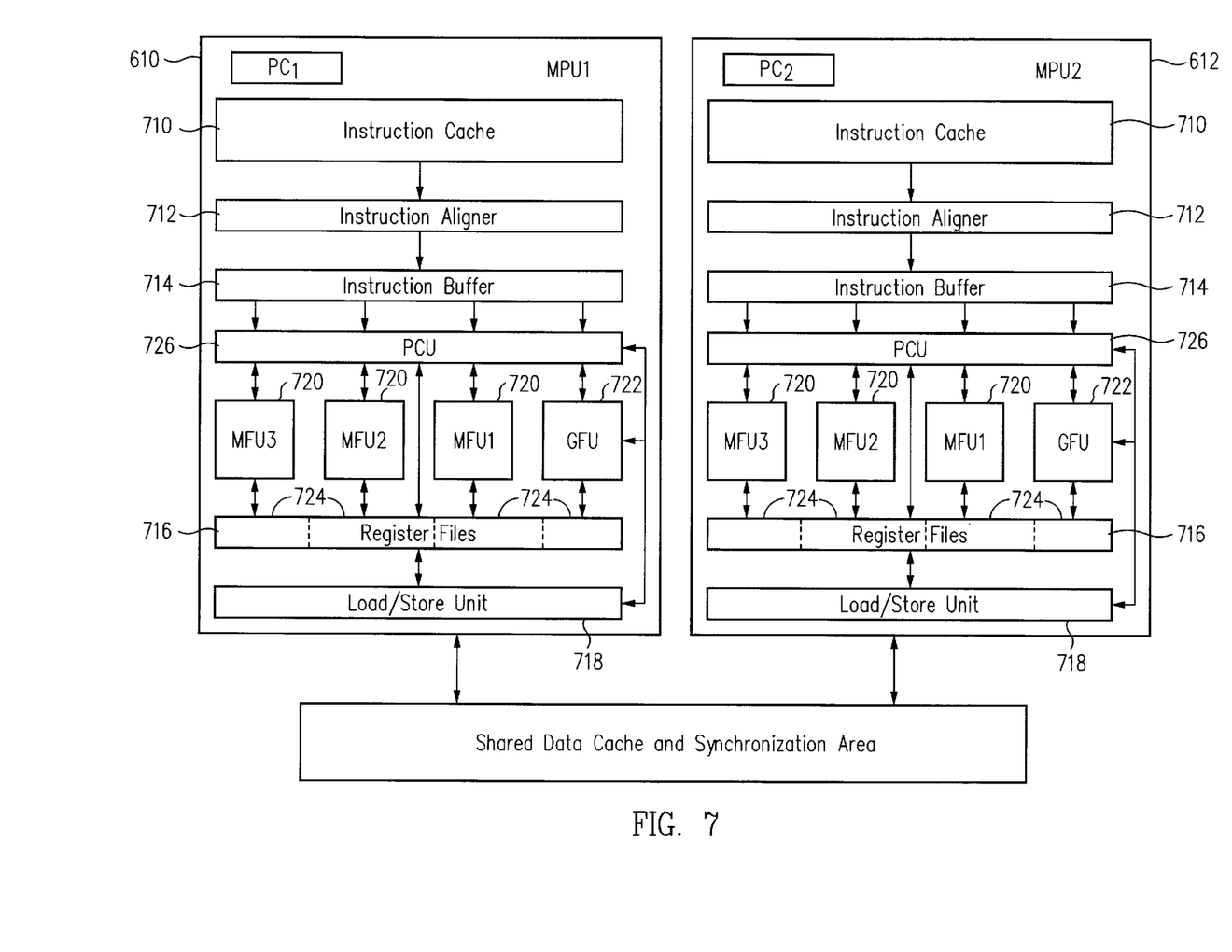
FIG. 7 is a schematic block diagram shows a suitable core for usage in the processor illustrated in FIG. 6.

Referring to FIG. 7, a schematic block diagram shows the core of the processor 600. The media processing units 610 and 612 each include an instruction cache 710, an instruction aligner 712, an instruction buffer 714, a pipeline control unit 726, a split register file 716, a plurality of execution units, and a load/store unit 718. In the illustrative processor 600, the media processing units 610 and 612 use a plurality of execution units for executing instructions. The execution units for a media processing unit 610 include three media functional units (MFU) 720 and one general functional unit (GFU) 722. The media functional units 720 are multiple single-instruction-multiple-datapath (MSIMD) media functional units. Each of the media functional units 720 is capable of processing parallel 16-bit components. Various parallel 16-bit operations supply the single-instruction-multiple-datapath capability for the processor 600 including add, multiply-add, shift, compare, and the like. The media functional units 720 operate in combination as tightly-coupled digital signal processors (DSPs). Each media functional unit 720 has an separate and individual sub-instruction stream, but all three media functional units 720 execute synchronously so that the subinstructions progress lock-step through pipeline stages.

The general functional unit 722 is a RISC processor capable of executing arithmetic logic unit (ALU) operations, loads and stores, branches, and various specialized and esoteric functions such as parallel power operations, reciprocal squareroot operations, and many others. The general functional unit 722 supports less common parallel operations such as the parallel reciprocal square root instruction.

The illustrative instruction cache 710 has a 16 Kbyte capacity and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instructions store2i. Software uses the store2i instruction to maintain coherency with the instruction cache 710 so that the instruction caches 710 do not have to be snooped on every single store operation issued by the media processing unit 610.

The pipeline control unit 726 is connected between the instruction buffer 714 and the functional units and schedules the transfer of instructions to the functional units. The pipeline control unit 726 also receives status signals from the functional units and the load/store unit 718 and uses the status signals to perform several control functions. The pipeline control unit 726 maintains a scoreboard, generates stalls and bypass controls. The pipeline control unit 726 also generates traps and maintains special registers.

Each media processing unit 610 and 612 includes a split register file 716, a single logical register file including 128 thirty-two bit registers. The split register file 716 is split into a plurality of register file segments 724 to form a multi-ported structure that is replicated to reduce the integrated circuit die area and to reduce access time. A separate register file segment 724 is allocated to each of the media functional units 720 and the general functional unit 722. In the illustrative embodiment, each register file segment 724 has 128 32-bit registers. The first 96 registers (0–95) in the register file segment 724 are global registers. All functional units can write to the 96 global registers. The global registers are coherent across all functional units (MFU and GFU) so that any write operation to a global register by any functional unit is broadcast to all register file segments 724. Registers 96–127 in the register file segments 724 are local registers. Local registers allocated to a functional unit are not accessible or "visible" to other functional units.

The media processing units 610 and 612 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 722 and from zero to three instructions that execute in the media functional units (MFU) 720. A MFU instruction field within the VLIW instruction word includes an operation code (opcode) field, three source register (or immediate) fields, and one destination register field.

Instructions are executed in-order in the processor 600 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 610 and 612 are high-performance but simplified with respect to both compilation and execution. The media processing units 610 and 612 are most generally classified as a simple 2-scalar execution engine with full bypassing and hardware interlocks on load operations. The instructions include loads, stores, arithmetic and logic (ALU) instructions, and branch instructions so that scheduling for the processor 600 is essentially equivalent to scheduling for a simple 2-scalar execution engine for each of the two media processing units 610 and 612.

The processor 600 supports full bypasses between the first two execution units within the media processing unit 610 and 612 and has a scoreboard in the general functional unit 722 for load operations so that the compiler does not need to handle nondeterministic latencies due to cache misses. The processor 600 scoreboards long latency operations that are executed in the general functional unit 722, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 722 or the first media functional unit 720, then the stall only endures until the result is available for intra-unit bypass. For the case of a load instruction that hits in the data cache 606, the stall may last only one cycle. If the referencing instruction is on the second or third media functional units 720, then the stall endures until the result reaches the writeback stage in the pipeline where the result is bypassed in transmission to the split register file 716.

The scoreboard automatically manages load delays that occur during a load hit. In an illustrative embodiment, all loads enter the scoreboard to simplify software scheduling and eliminate NOPs in the instruction stream.

The scoreboard is used to manage most interlocks between the general functional unit 722 and the media functional units 720. All loads and non-pipelined long-latency operations of the general functional unit 722 are scoreboarded. The long-latency operations include division idiv, fdiv instructions, reciprocal squareroot frecsqrt, precsqrt instructions, and power ppower instructions. None of the results of the media functional units 720 is scoreboarded. Non-scoreboarded results are available to subsequent operations on the functional unit that produces the results following the latency of the instruction.

The illustrative processor 600 has a rendering rate of over fifty million triangles per second without accounting for operating system overhead. Therefore, data feeding specifications of the processor 600 are far beyond the capabilities of cost-effective memory systems. Sufficient data bandwidth is achieved by rendering of compressed geometry using the geometry decompressor 604, an on-chip real-time geometry decompression engine. Data geometry is stored in main memory in a compressed format. At render time, the data geometry is fetched and decompressed in real-time on the integrated circuit of the processor 600. The geometry decompressor 604 advantageously saves memory space and memory transfer bandwidth. The compressed geometry uses an optimized generalized mesh structure that explicitly calls out most shared vertices between triangles, allowing the processor 600 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 720 are fully utilized.

Figure 8:
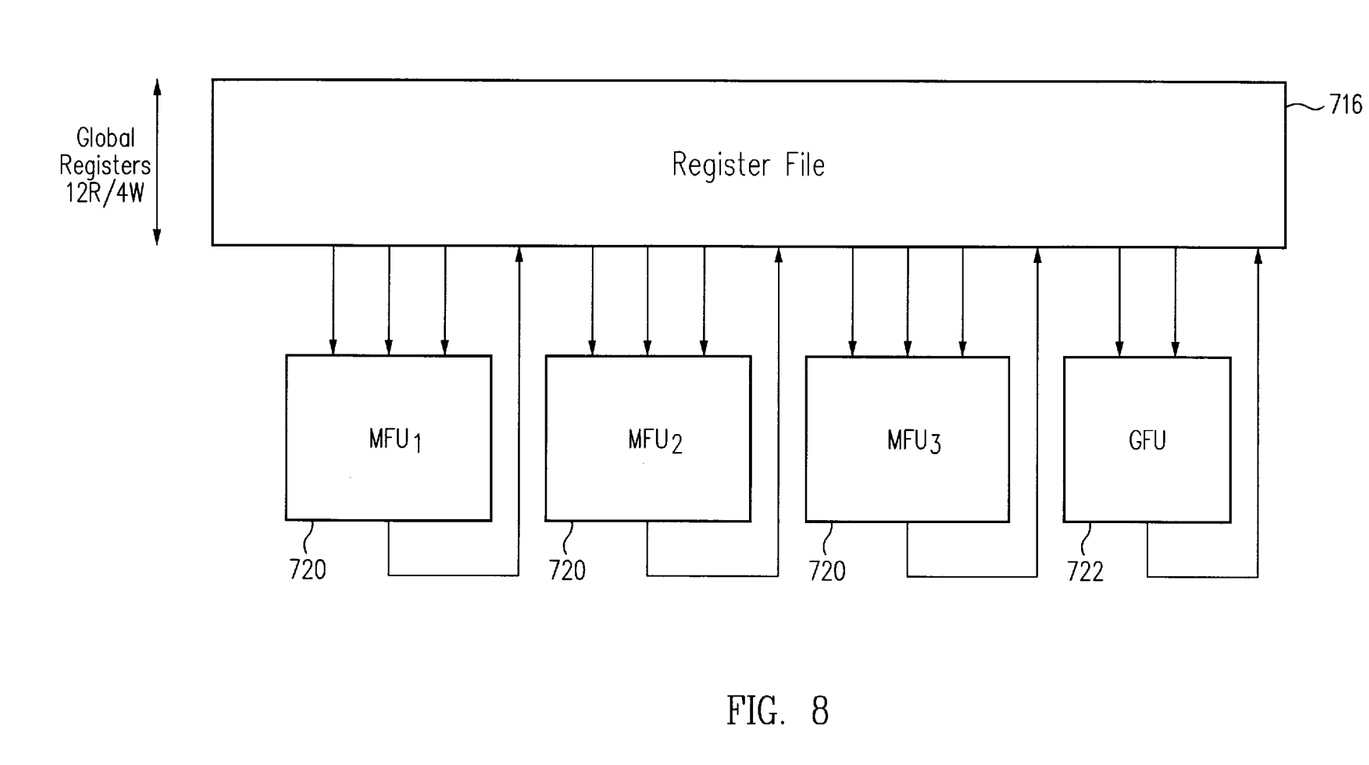
FIG. 8 is a schematic block diagram that shows a logical view of the register file and functional units in the processor.

Referring to FIG. 8, a schematic block diagram shows a logical view of the register file 716 and functional units in the processor 600. The physical implementation of the core processor 600 is simplified by replicating a single functional unit to form the three media processing units 610. The media processing units 610 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

A media processing unit 610 includes a 32-bit floating-point multiplier-adder to perform signal transform operations, clipping, facedness operations, sorting, triangle set-up operations, and the like. The media processing unit 610 similarly includes a 16×16-bit integer multiplier-adder for perform operations such as lighting, transform normal lighting, computation and normalization of vertex view vectors, and specular light source operations. The media processing unit 610 supports clipping operations and 1/squareroot operations for lighting tasks, and reciprocal operations for screen space dividing, clipping, set-up, and the like. For VIS operations, the media processing unit 610 supports 16/32-bit integer add operations, 16×16-bit integer multiplication operations, parallel shifting, and pack, unpack, and merge operations. For general-purpose code, the media processing unit 610 supports 32-bit integer addition and subtraction, and 32-bit shift operations. The media processing unit 610 supports a group load operation for unit stride code, a bit extract operation for alignment and multimedia functionality, a pdist operation for data compression and averaging, and a byte shuffle operation for multimedia functionality.

The media processing unit 610 supports the operations by combining functionality and forming a plurality of media functional units 720 and a general functional unit 722. The media functional units 720 support a 32-bit floating-point multiply and add operation, a 16×16-bit integer multiplication and addition operation, and a 8/16/32-bit parallel add operation. The media functional units 720 also support a clip operation, a bit extract operation, a pdist operation, and a byte shuffle operation. Other functional units that are in some way incompatible with the media functional unit 720 or consume too much die area for a replicated structure, are included in the general functional unit 722. The general functional unit 722 therefore includes a load/store unit, a reciprocal unit, a 1/squareroot unit, a pack, unpack and merge unit, a normal and parallel shifter, and a 32-bit adder.

Computation instructions perform the real work of the processor 600 while load and store instructions may considered mere overhead for supplying and storing computational data to and from the computational functional units. To reduce the number of load and store instructions in proportion to the number of computation instructions, the processor 600 supports group load (ldg) and store long (stl) instructions. A single load group loads eight consecutive 32-bit words into the split register file 716. A single store long sends the contents of two 32-bit registers to a next level of memory hierarchy. The group load and store long instructions are used to transfer data among the media processing units 610, the UPA controller 616, and the geometry decompressor 604.

Figure 9:
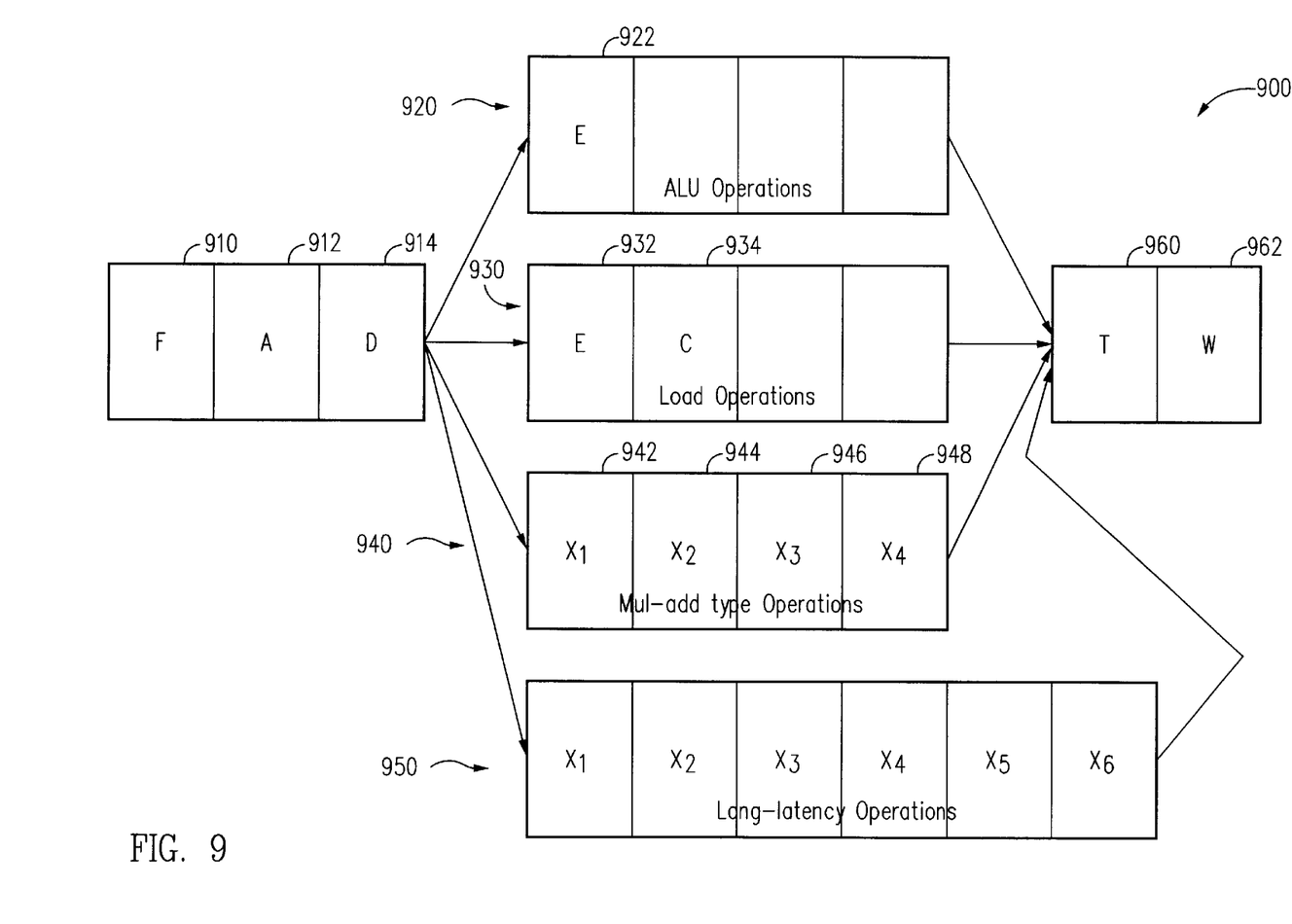
FIG. 9 is a schematic timing diagram that illustrates timing of the processor pipeline.

Referring to FIG. 9, a simplified schematic timing diagram illustrates timing of the processor pipeline 900. The pipeline 900 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 910 during which the processor 600 fetches instructions from the 16 Kbyte two-way set-associative instruction cache 710. The fetched instructions are aligned in the instruction aligner 712 and forwarded to the instruction buffer 714 in an align stage 912, a second stage of the initiating stages. The aligning operation properly positions the instructions for storage in a particular segment of the four register file segments and for execution in an associated functional unit of the three media functional units 720 and one general functional unit 722. In a third stage, a decoding stage 914 of the initiating stages, the fetched and aligned VLIW instruction packet is decoded and the scoreboard (not shown) is read and updated in parallel. The four register file segments each holds either floating-point data or integer data.

Following the decoding stage 914, the execution stages are performed. The particular stages that are performed within the execution stages vary depending on the particular instruction to be executed. A single execution stage 922 is performed for critical single-cycle operations 920 such as, add, logical, compare, and clip instructions. Address-cycle type operations 930, such as load instructions, are executed in two execution cycles including an address computation stage 932 followed by a single-cycle cache access 934. General arithmetic operations 940, such as floating-point and integer multiply and addition instructions, are executed in four stages $X_1$ 942, $X_2$ 944, $X_3$ 946, and $X_4$ 948. Extended operations 950 are long instructions such as floating-point divides, reciprocal squareroots, 16-bit fixed-point calculations, 32-bit floating-point calculations, and parallel power instructions, that last for six cycles, but are not pipelined.

The two terminating stages include a trap-handling stage 960 and a write-back stage 962 during which result data is written-back to the split register file 716.

Computational instructions have fundamental importance in defining the architecture and the instruction set of the processor 600. Computational instructions are only semantically separated into integer and floating-point categories since the categories operate on the same set of registers.

The general functional unit 722 executes a fixed-point power computation instruction ppower. The power instruction has the form ppower r[rs1],r[rs2],r[rd] and computes "r[rs1]**r[rs2]" where each of the sources is operated upon as a pair of independent 16-bit S2.13 format fixed-point quantities. The result is a pair of independent 16-bit S2.13 format fixed-point powers placed in the register r[rd]. Zero to any power is defined to give a zero result.

The general functional unit 722 includes functional units that execute a floating-point division fdiv instruction, a floating-point reciprocal frecip instruction, a floating-point squareroot fsqrt instruction, and a floating-point reciprocal squareroot frecsqrt instruction, each for single-precision numbers. The floating-point division instruction has the form fdiv rs1,rs2,rd and computes a single-precision floating-point division "r[rs1]/r[rs2]" and delivers the result in r[rd]. The floating-point reciprocal instruction has the form frecip rs1,rd and executes a single-precision floating-point reciprocal with a latency of eight cycles. The floating-point squareroot instruction has the form fsqrt rs1,rd and executes a single-precision floating-point square root operation. The floating-point reciprocal squareroot instruction has the form frecsqrt rs1,rd and executes a single-precision floating-point reciprocal of the square root operation on the quantity in r[rs1] and places the result in r[rd].

The general functional unit 722 also supports a fixed-point parallel reciprocal squareroot precsqrt instruction. The fixed-point reciprocal squareroot instruction has the form precsqrt rs1,rd. Precsqrt computes a pair of S2.13 format fixed-point reciprocal square roots of the pair of S2.13 format values on register r[rs1]. Results are delivered in register r[rd]. The result for a source operand that is less than or equal to zero is undefined.

The general functional unit 722 executes an integer divide idiv instruction that computes either "r[rs1]/r[rs2]" or "r[rs1]/sign_ext(imm14)" and places the result in r[rd].

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

CROSS-REFERENCE

The present invention is related to subject matter disclosed in the following co-pending patent applications:

1. United States patent application entitled, "Division Unit in a Processor Using a Piece-wise Quadratic Approximation Technique", <atty. docket no.: SP-2589>naming Ravi Shankar and Subramania Sudharsanan as inventors and filed on even date herewith;

2. United States patent application entitled, "Fixed-Point Parallel Square Root and Reciprocal Square Root Computation Unit in a Processor", <atty. docket no.: SP-2593>naming Ravi Shankar and Subramania Sudharsanan as inventors and filed on even date herewith.

What is claimed is:

1. A method of computing a reciprocal square root of a number X in a computing device comprising:

computing a piece-wise quadratic approximation of the number X using an equation of the form:

$1/\sqrt{X} = Ax^2+Bx+C$, the number X having a mantissa and an exponent, the computing operation including:

accessing the A, B, and C coefficients from a storage;
computing the value $Ax^2+Bx+C$ result, the result having a mantissa and an exponent;
shifting the result exponent right by one bit;
correcting an error that occurs when an asserted bit in the result exponent is discarded by the shifting operation, the correcting operation including multiplying the computed result by a correction constant.

2. A method according to claim 1 further comprising:
correcting an error that occurs when an asserted bit in the result exponent is discarded by the shifting operation, the correcting operation including multiplying the computed result by a correction constant with a value $\frac{1}{2}^{0.5}$.

3. A method according to claim 1 further comprising:
deriving the coefficients A, B, and C to reduce least mean square error using a least squares approximation of a plurality of equally-spaced points within an interval.

4. A method according to claim 1 wherein:
the number X is a floating point number.

5. A method according to claim 1 wherein:
the number X is a floating point number in which the value X designates the mantissa and x designates lower order bits of the floating point number X.

6. A method of computing a square root of a number 1/Y equal to X according to claim 1.

7. An integrated circuit including:
a multiplier;
an adder coupled to the multiplier; and
a control logic coupled to the multiplier and the adder, the control logic performing the method according to claim 1.

8. A processor comprising:
an instruction storage;
a register file coupled to the instruction storage;
a functional unit including:
   a multiplier;
   an adder coupled to the multiplier; and
   a control logic coupled to the multiplier and the adder, the control logic performing the method according to claim 1.

9. A method of computing a square root of a number X in a computing device comprising:
computing a piece-wise quadratic approximation of the number X having a mantissa and an exponent in a plurality of parallel data paths using an equation of the form:
$\sqrt{X}=Ax^2+Bx+C$, the computing operation including:
   accessing the A, B, and C coefficients from a storage;
   squaring the x term of the number X to obtain an $x^2$ term;
   multiplying the $x^2$ term times the coefficient A to obtain an $Ax^2$ term;
   multiplying the x term times the coefficient B to obtain a Bx term;
   summing the $Ax^2$ term, the Bx term, and the C term to form an approximation result;
   shifting the exponent right; and
   multiplying the approximation result by a correction constant.

10. A method according to claim 9 further comprising:
multiplying the approximation result by a correction constant with a value $½^{0.5}$.

11. A method according to claim 9 further comprising:
accessing the A, B, and C coefficients from a storage and squaring the x term of the number X to obtain an $x^2$ term in a single clock cycle.

12. A method according to claim 9 further comprising:
multiplying the $x^2$ term times the coefficient A to obtain an $Ax^2$ term and multiplying the x term times the coefficient B to obtain a Bx term in a single clock cycle.

13. A method according to claim 9 further comprising:
summing the $Ax^2$ term, the Bx term, and the C term to form an approximation result and shifting the exponent right in a single clock cycle.

14. A method according to claim 9 further comprising:
deriving the coefficients A, B, and C to reduce least mean square error using a least squares approximation of a plurality of equally-spaced points within an interval.

15. A method according to claim 9 wherein:
the number X is a floating point number.

16. A method according to claim 9 wherein:
the number X is a floating point number in which the value X designates the mantissa and x designates lower order bits of the floating point number X.

17. A method of computing a square root of a number 1/Y equal to X according to claim 9.

18. An integrated circuit including:
a multiplier;
an adder coupled to the multiplier; and
a control logic coupled to the multiplier and the adder, the control logic performing the method according to claim 9.

19. A processor comprising:
an instruction storage;
a register file coupled to the instruction storage;
a functional unit including:
   a multiplier;
   an adder coupled to the multiplier; and
   a control logic coupled to the multiplier and the adder, the control logic performing the method according to claim 9.

20. A computation unit comprising:
a multiplier;
an adder coupled to the multiplier;
a connection to a storage, the storage storing coefficients for computing a piece-wise quadratic approximation; and
a control logic controlling the adder, the multiplier, and access of the storage, the control logic controlling computation of a piece-wise quadratic approximation of the floating point number X using an equation of the form:

$$1/\sqrt{X}=Ax^2+Bx+C;$$

a shifter for shifting the result exponent right by one bit; and
error correcting logic for correcting an error that occurs when an asserted bit in the result exponent is discarded by the shifting operation, the correcting operation including multiplying the computed result by a correction constant.

* * * * *